No. 694,023. Patented Feb. 25, 1902.
L. P. A. NELSON.
SIDING GAGE.
(Application filed Nov. 27, 1901.)
(No Model.)
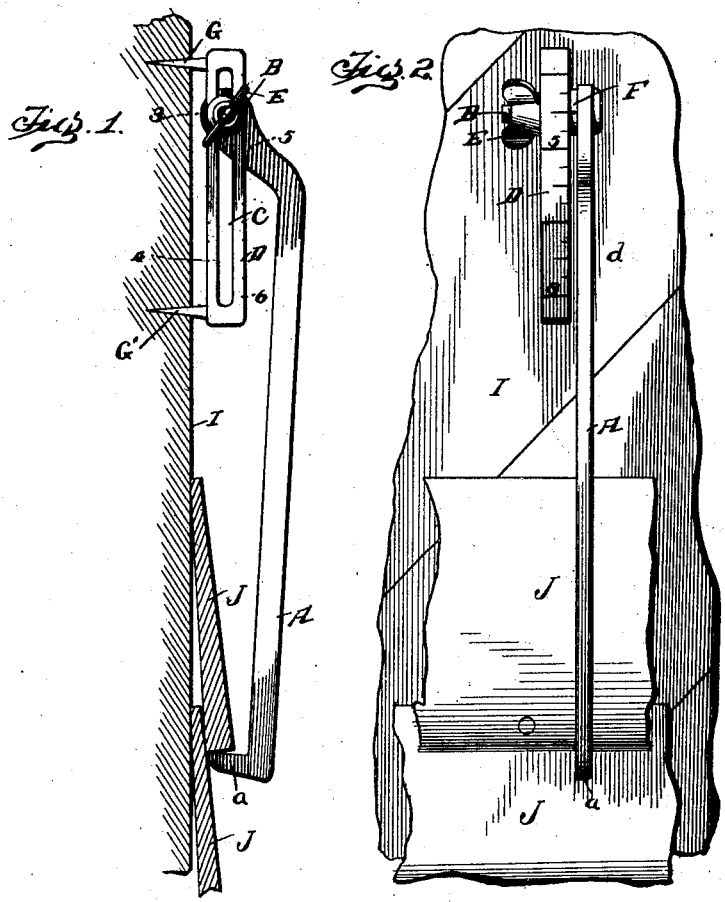
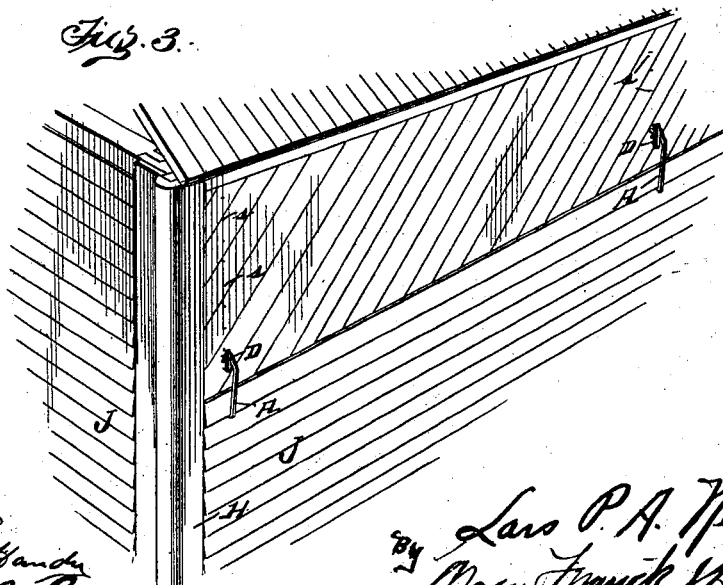
Witnesses
L. G. Hander
R. B. Cavanagh
Inventor
Lars P. A. Nelson
By Macro Franck
his Attorneys
THE NORRIS PETERS CO., PHOTO-LITHO., WASHINGTON, D. C.

UNITED STATES PATENT OFFICE.

LARS P. A. NELSON, OF POYSIPPI, WISCONSIN.

SIDING-GAGE.

SPECIFICATION forming part of Letters Patent No. 694,023, dated February 25, 1902.

Application filed November 27, 1901. Serial No. 83,884. (No model.)

*To all whom it may concern:*

Be it known that I, LARS P. A. NELSON, a citizen of the United States, residing at Poysippi, in the county of Waushara and State of Wisconsin, have invented new and useful Improvements in Siding-Gages, of which the following is a specification.

My invention relates to improvements in gages, and is especially designed for hanging drop-siding.

The objects of my invention are, first, to gage the proper lap of the siding; second, to hold the siding for marking to saw off, and, third, to afford a means of holding the siding so that if necessary one man alone can lay siding. In the use of my invention two or more gages are used to support the siding.

In the accompanying drawings, Figure 1 is a side view, and Fig. 2 a front view, of my invention. Fig. 3 illustrates the manner of using the gages.

Similar letters refer to similar parts in each view.

A represents the hanger, which rocks on a pivot B, extending through a slot C in the gage D and held at any desired position by the thumb-screw E.

F is a washer interposed between the hanger A and the gage D.

Two brad-points G G' are provided integral with the gage.

At the lower end of the hanger A there is provided a rectangular inwardly-extending hook a.

d represents a graduated scale of inches on both sides of the gage. One side is graduated "3 4" inches and the opposite side "5 6" inches.

In the use of my invention the width of the siding to the weather may be gaged from either brad-point G or G'. When gaging from the point G, the side of the gage marked "5 6" will indicate the number of inches and fractions of inches to the weather, and when gaging from the point G' the side of the gage marked "3 4" will indicate the number of inches and fractions of inches to the weather.

In the use of my invention the distance to be sided is measured and then apportioned, so as to determine the number of inches each siding shall be laid to the weather. This may vary on the side of a house to accommodate windows or other openings. As soon as the width to the weather is determined the points s s s, &c., are marked off on the sheathing by dividers or by other means and indicated, as shown in Fig. 3.

H represents the corner-board, I the sheathing, and J the siding.

If it is desired to lay the siding three inches to the weather, the distance is marked or dotted off on the sheathing s s s, &c., as shown in Fig. 3. Then the gage is set at "3" on the scale, as described, and the brad-point G' driven into one of the points s s s, &c. The hook a will then be six inches below the brad-point G', or two siding-widths below. In the use of my invention the hook a is always two widths below the brad-point used. In this way the hanger always supports the siding two widths below. This is an essential feature of my invention. The siding is thereby supported and held out of the way of either point of the gage. The use of two gages supports the siding and holds it properly against the corner-board H, so that it may be marked for sawing off and afterward held for nailing to the sheathing. It will be observed that with the use of two gages one person can lay siding, the hanger A and hook a operating to hold one end of the siding for marking to saw off and for nailing to the sheathing.

It should be understood that my invention is not only a gage for determining the distance, but also a hanger for supporting the siding in position, and that the siding is always supported two widths below the point of support, so as to be entirely out of the way. The hanger A is readily revoluble upon the pivot B, so that it may be raised outwardly and the siding placed inside against the sheathing, and then the hanger by gravitation drops to support the siding. My invention is capable of being operated very rapidly and conveniently.

If it is desired to lay the siding six inches to the weather, after marking off such distance s s s, &c., on the sheathing the gage is set at "6." The upper brad-point G will then be twelve inches or two siding widths from the hook a. Both points are driven into the sheathing for support and to prevent turning; but the point used for gaging is the one that should be driven into the marked positions $s\ s\ s$, &c. After one piece of siding is laid the gage is attached one position $s$ above. The points $s\ s\ s$, &c., can be spaced off very quickly on the sheathing, and as in the use of my invention the siding is always attached two widths below the marks $s\ s\ s$, &c., are never covered by the siding lap until after used.

Having now described my invention, what I claim, and desire to secure by Letters Patent, is—

1. In a device of the class described the combination of a slotted gage-bar, a relatively long pivoted arm secured to said gage-bar, and means for adjusting said arm at any predetermined distance along said gage-bar, substantially as set forth.

2. In a device of the class described, the combination of a slotted gage-bar provided with fastening-prongs formed on the under surface thereof, a relatively long arm pivotally held at the side of said gage-bar by means extending through the slot therein, and means for adjusting the arm at any predetermined distance along said slot, substantially as set forth.

3. In a device of the class described, the combination of a slotted gage-bar provided on its lower surface with fastening-prongs, and having its upper and lower faces marked with a graduated measuring-scale, a bolt extending through the slot in said scale and carrying at one end a relatively long arm, said arm being provided at its lower end with a hook-shaped portion, and means, comprising a thumb-screw threaded on the opposite end of said bolt, for holding said bolt and arm in any predetermined position relative to either of the measuring-scales, substantially as set forth.

4. A device of the class described, comprising a slotted gage-bar having its surfaces marked with graduated measuring-scales, a bolt extending through said slots and adjustably secured therein, an annular shoulder formed on the bolt near the head thereof, and a relatively long hook-shaped arm pivotally secured to said bolt between the annular shoulder and the head of said bolt, substantially as set forth.

In testimony whereof I have hereunto set my hand in the presence of two subscribing witnesses.

LARS P. A. NELSON.

Witnesses:
 HERBERT NINTZEL,
 ANNA R. WATERHOUSE.